United States Patent
Niesser et al.

(10) Patent No.: US 9,697,023 B2
(45) Date of Patent: Jul. 4, 2017

(54) METHOD AND ARRANGEMENT FOR USING A RESOURCE OF A HARDWARE PLATFORM WITH AT LEAST TWO VIRTUAL MACHINES

(71) Applicant: Siemens Aktiengesellschaft, Munich (DE)

(72) Inventors: Otto Niesser, Allersberg (DE); Halil Caglar Ünver, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 492 days.

(21) Appl. No.: 13/627,477

(22) Filed: Sep. 26, 2012

(65) Prior Publication Data

US 2013/0125117 A1    May 16, 2013

(30) Foreign Application Priority Data

Sep. 28, 2011   (EP) .................................... 11183123

(51) Int. Cl.
    *G06F 9/455*    (2006.01)
(52) U.S. Cl.
    CPC ................................ *G06F 9/45533* (2013.01)
(58) Field of Classification Search
    None
    See application file for complete search history.

(56) References Cited

U.S. PATENT DOCUMENTS

| | | | |
|---|---|---|---|
| 8,650,565 B2 * | 2/2014 | Narasimhan ....................... 718/1 |
| 2006/0200821 A1 | 9/2006 | Cherkasova et al. | |
| 2010/0274940 A1 | 10/2010 | Ahmad et al. | |
| 2011/0072426 A1 * | 3/2011 | Huang et al. ..................... 718/1 |
| 2011/0145916 A1 * | 6/2011 | McKenzie et al. ............. 726/19 |
| 2012/0033673 A1 * | 2/2012 | Goel ............................. 370/400 |

FOREIGN PATENT DOCUMENTS

CN        101551756        10/2009

OTHER PUBLICATIONS

Wikipedia: "Paravirtualization", Sep. 7, 2011 (Sep. 7, 2011). Seiten 1-3. XP55016151, Gefunden im Internet: URL:http://en.wikipedia.org/w/index.php?title=Paravirtualization&oldid=448879809 [gefunden am Jan. 11, 2012]*das ganze Dokument*; Others; 2011.

* cited by examiner

*Primary Examiner* — Kenneth Tang
(74) *Attorney, Agent, or Firm* — Cozen O'Connor

(57) ABSTRACT

A method and arrangement for using a resource of a hardware platform with at least two virtual machines, wherein a virtualization controller for administering the virtual machines executes on the hardware platform, a first machine of the virtual machines with a first operating system executes separately on a first processor core or a first processor, and further virtual machines execute on a further processor core or processor. One of the further virtual machines comprises a service machine including a first driver for accessing the resource, where the first operating system includes a para-virtualized second driver for accessing the resource, and requests by the para-virtualized second driver to access the resource are directed to the first driver that converts the requests into access operations to the resource.

10 Claims, 4 Drawing Sheets

METHOD AND ARRANGEMENT FOR USING A RESOURCE OF A HARDWARE PLATFORM WITH AT LEAST TWO VIRTUAL MACHINES

BACKGROUND OF THE INVENTION

1. Field of the Invention

The invention relates to a method for using a common resource, and to a hardware component including a plurality of virtual machines.

2. Description of the Related Art

Personal computers and similar customary hardware architectures are being increasingly used to implement programmable logic controllers (i.e., soft PLCs). As a rule, what are referred to as real-time operating systems are used for these programmable logic controllers, where the operating systems are therefore configured or changed to meet stringent requirements, such as reaction times, cycle times or operating reliability. In this context, virtualization techniques are often applied, i.e., a virtualization controller/virtualization software (Virtual Machine Manager, Hypervisor) is used to allow the real-time operating system to run in a separate virtual running time environment. If other orders are also to be performed with the same hardware platform, non-real-time operating systems (i.e., "general purpose operation systems"), can also be made to run in parallel in further virtual machines.

If both operating systems in such an architecture access a resource that is only present once (for example, a network card or an IDE controller), the access to the resource is coordinated by the hypervisor in a synchronization component. Here, the non-real-time operating system whose structure often cannot be changed, accesses the hardware of the resource directly, in which case these access operations have to be intercepted and correspondingly coordinated by the hypervisor to be able to perform the order of the non-real-time operating system in a "quasi-parallel" manner with respect to orders of the real-time operating system.

In principle, it is equally possible to perform an access operation at the real-time operating system, but it is advantageous not to have recourse to a driver in a way which is analogous to the non-real-time operating system but rather to use a para-virtualized driver, which means that the real-time operating system has knowledge of how it is running under the control of the hypervisor and interacts therewith in an optimized way.

Ideally, the above-described procedure is configured such that waiting times (for example, polling on the hardware register) for the resource do not adversely affect the real-time operating system in terms of its real-time performance. In particular, waiting times must not be shifted back in the hypervisor during the interruption of the real-time operating system. Nevertheless, an unavoidable delay occurs during the interaction with the hypervisor, precisely as a result of the implied or programmed exit ("VmExit") into the hypervisor, such as a result of monitoring of memory addresses, IO addresses or PCI Config-Space, of the accessed resource or as a result of a hypercall in the para-virtualized approach. The entirety of this delay is included in the real-time performance, i.e., in the interrupt latency time.

SUMMARY OF THE INVENTION

It is therefore an object of the present invention to reduce or to avoid adverse effects on performance of a real-time operating system during the access of commonly used resources.

This and other objects and advantages are achieved in accordance with the invention by providing, in a virtual machine that does not run on the same processor core or the same processor on which the real-time operating system is arranged, a "service machine" that performs the access operations to the resource. In accordance with the invention, the real-time operating system uses a para-virtualized driver which, however, does not make an exit into the virtualization software (Virtual Machine Manager, Hypervisor) to access the resource. Instead, the para-virtualized driver directs corresponding requests to the service machine that is arranged on another processor core or processor. As a result, the service machine is activated whenever the real-time operating system outputs a para-virtualized order to the (commonly used) resource.

In accordance with the invention, a method is provided for using a resource of a hardware platform with at least two virtual machines, where a first machine of the virtual machines with a first operating systems runs separately on at least a first processor core or a first processor, and where a number (at least one) of further virtual machines runs on at least one further processor core or processor. In this context, one of the further virtual machines comprises a service machine that includes a first driver for accessing the resource, where the first operating system has a para-virtualized second driver for accessing the resource, and where requests by the para-virtualized second driver to access the resource are directed to the first driver. The first driver converts the requests into access operations to the resource. In this way, the para-virtualized second driver can transmit an order to the processor core or processor with the service machine without interrupting the processing of the real-time operating system by an interaction with the virtualization controller (Virtual Machine Manager, Hypervisor), for example by a "VM Exit" or a "Hypercall".

It is also an object of the invention to provide a hardware platform having a plurality of processor cores or a plurality of processors, a plurality of virtual machines, and a virtualization controller for administering the virtual machines. In this context, a first virtual machine has a first operating system, where the first virtual machine runs separately at least on a first processor core or a first processor. A number (at least one) of further virtual machines runs on at least one further processor core or processor, where one of the further virtual machines comprises a service machine that includes a first driver for accessing the resource. The first operating system also includes a para-virtualized second driver for accessing the resource, where the para-virtualized second driver is configured such that its requests to access the resource are directed to the first driver, and where the first driver is configured to convert the requests into access operations to the resource. A hardware platform which is configured in this way can be used to implement the advantages of the method in accordance with the invention.

In an embodiment of the method in accordance with the invention, the first operating system is advantageously configured as a real-time operating system that is not adversely affected in terms of its real-time properties even in the case of access operations to resources that are used by other virtual machines and operating systems in the machines. Here, at least one further operating system, i.e., a non-real-time operating system or General Purpose Operation System (GPOS) can run in a further virtual machine, where the further virtual machines are to be implemented with the one operating system or the plurality of other operating systems on other processor cores or processors other than the real-time operating system. In another advantageous embodiment, one of the non-real-time operating systems can also be used as a service machine. As a result, the hardware platform can also perform non-time-critical orders as well as the real-time operating system, without having to operate an unnecessarily large number of virtual machines. What is referred to as a general operating system, i.e., a customary operating system for personal computers, such as Microsoft Windows, Linux and others, can advantageously be used as a further operating system (non-real-time operating system).

In particular when a separate service machine is used, i.e., a service machine that does not perform any other tasks apart from accessing hardware resources, this service machine is advantageously activated only in the course of the requests by the para-virtualized second driver. As a result, in phases in which there is no need to perform or coordinate any access operation to a resource, the service machine does not consume any computing time or resources of the corresponding processor or core either.

In another advantageous embodiment, in the course of the requests by the para-virtualized second driver, an inter-processor interrupt is transmitted from the first virtual machine to the processor or processor core with the service machine, where the service machine enters a processing routine of the first driver. As a result, it becomes possible to ensure that the service machine is activated only in the case of requests by the para-virtualized second driver, while other interrupts of the hardware platform can be ignored. A start signal or an Init signal is advantageously used as the inter-processor interrupt, which start signal or Init signal is configured in accordance with the invention such that a call ("entry") of the corresponding first driver occurs instead of initialization or a re-start of a virtual machine.

In a further advantageous embodiment, the service machine coordinates access operations by the first and the further operating system to the same resource by an integrated synchronization device. As a result, the virtualization controller can correspondingly maintain short execution times. In an alternative embodiment, however, the service machine can instead be given a correspondingly low-expenditure configuration if the access operations by the first and the further operating system to the same resource are coordinated by a synchronization device that is integrated into the virtualization controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the method according to the invention are explained below with reference to the drawings. These exemplary embodiments serve at the same time to explain a hardware platform in accordance with the invention, in which.

DETAILED DESCRIPTION OF THE PREFERRED EMBODIMENTS

Figure 1:
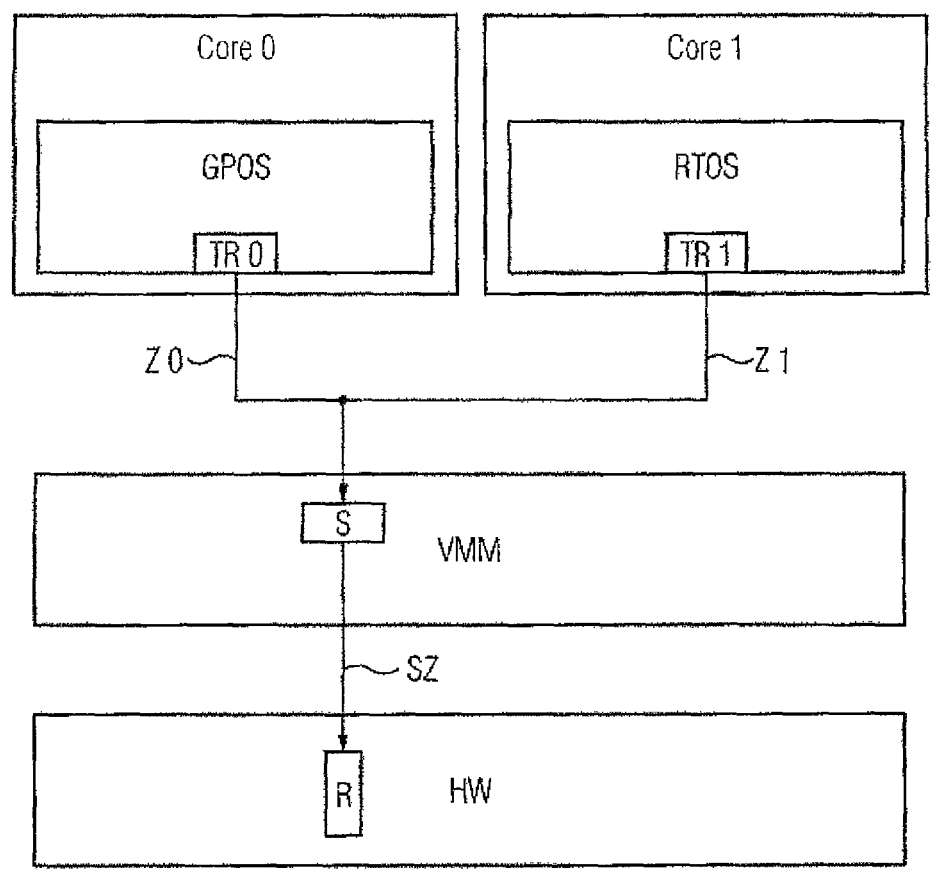
FIG. 1 is a schematic block diagram of a hardware platform including two virtual machines, a method and arrangement in accordance with the prior art.

FIG. 1 is a schematic block diagram illustrating a conventional hardware platform HW that comprises a resource R that is to be used by the operating systems RTOS, GPOS.

A virtualization controller VMM is installed on the hardware platform HW, where a real-time operating system RTOS runs in a first virtual machine, and a general operating system GPOS runs in a second, further virtual machine. Both virtual machines, and therefore both operating systems GPOS, RTOS, run on separate processor cores Core 0, Core 1. Each of the operating systems GPOS, RTOS respectively comprises a driver TR0, TR1 for accessing the resource R, where the access operations Z0, Z1 are intercepted by the virtualization controller VMM and coordinated by a synchronization component S. As a result, the resource R is ultimately accessed by an access operation SZ (synchronized access operation), and the access operation SZ is ultimately accessed by the resource R. In this conventional configuration, access operations Z1 by the driver TR1 of the real-time operating system RTOS can communicate with the virtualization controller VMM only when the virtualization controller VMM is active and is ready for processing corresponding requests in accordance with the protocol. The method steps in accordance with the invention that are suitable for remedying this problem are explained below with reference to the subsequent figures.

Figure 2:
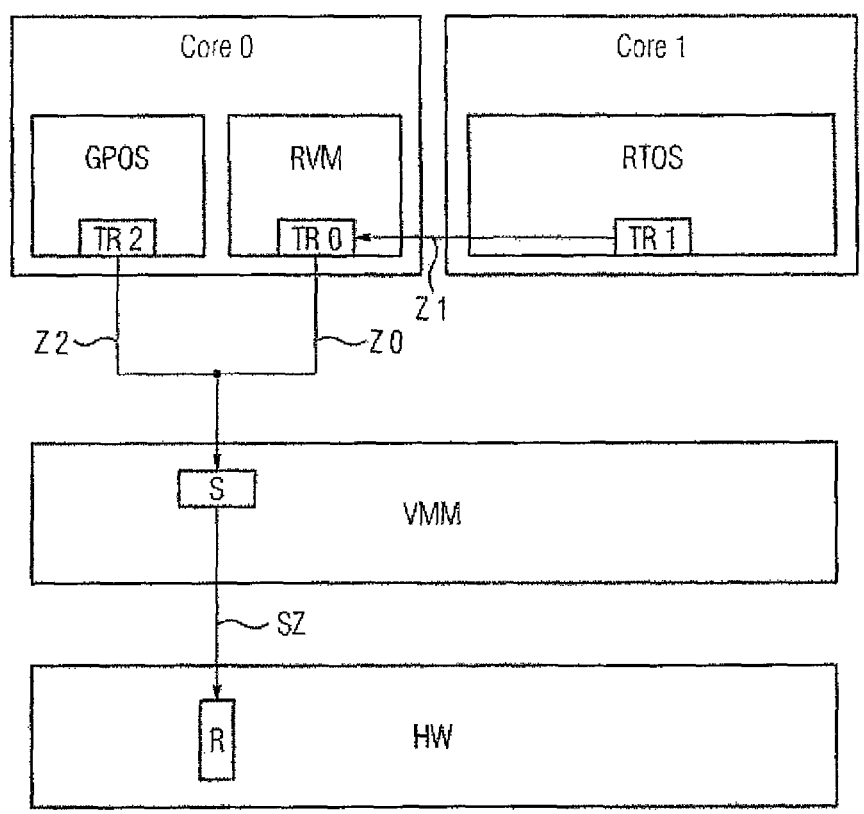
FIG. 2 is a schematic block diagram illustrating an embodiment of a hardware platform including three virtual machines in accordance with the invention.

In FIG. 2, the hardware platform HW described in FIG. 1 with the resource R, (such as a network card or an IDE controller) is illustrated. Here, however, two virtual machines (virtual running time environments) run on the processor core Core 0, where in addition to the general operating systems GPOS that are shown in FIG. 1, a service machine RVM ("Resource Virtual Machine") runs in a further virtual machine. The service machine RVM has the driver TR0 for accessing the resource R, while the operating systems GPOS, RTOS also have drivers TR2, TR1 for accessing the same resource R. In contrast to the conventional methodology, the driver TR1 of the real-time operating system RTOS in accordance with the invention is, however, configured as a para-virtualized driver, where access operations Z1 and the requests connected thereto (e.g., messages) of this driver TR1 are directed to the driver TR0 of the service machine RVM. For this purpose, the real-time operating system RTOS or the driver TR1 advantageously triggers an interrupt-processor interrupt at the processor core Core 0, such as an Init signal or a start signal, where the information that this inter-processor interrupt is intended to bring about a context change into the service machine RVM and therefore the "entry" into a software routine of the driver TR0 is stored in a "message box" or with some other communication method. The inter-processor interrupt therefore initially causes the processor core Core 0 to change to processing the virtualization controller VMM, after which the virtualization controller VMM triggers the call (context change) of the service machine RVM after evaluation of the "message box". As a result, the call of the driver TR0 also subsequently occurs. As a result of the high priority of the inter-processor interrupt, the virtualization controller VMM, and therefore as a result the driver TR0, are activated virtually without delay. As a consequence, the requests of the access operation Z1 can be conveyed virtually directly from the driver TR1 to the driver TR0. The driver TR0 then converts the requests of the "para-virtualized protocol" into access operations Z0 (corresponding to the standard) and either passes them on explicitly to the virtualization controller VMM or these access operations Z0 are intercepted by the virtualization controller VMM. A synchronization device S of the virtualization controller VMM coordinates the access operation Z0 with any other access operations Z2 of the general operating system GPOS and therefore generates synchronized access operations SZ for accessing the resource R. Messages and data of the resource R, which result, for example, from the access operation SZ, are processed in an inverse fashion.

Figure 3:
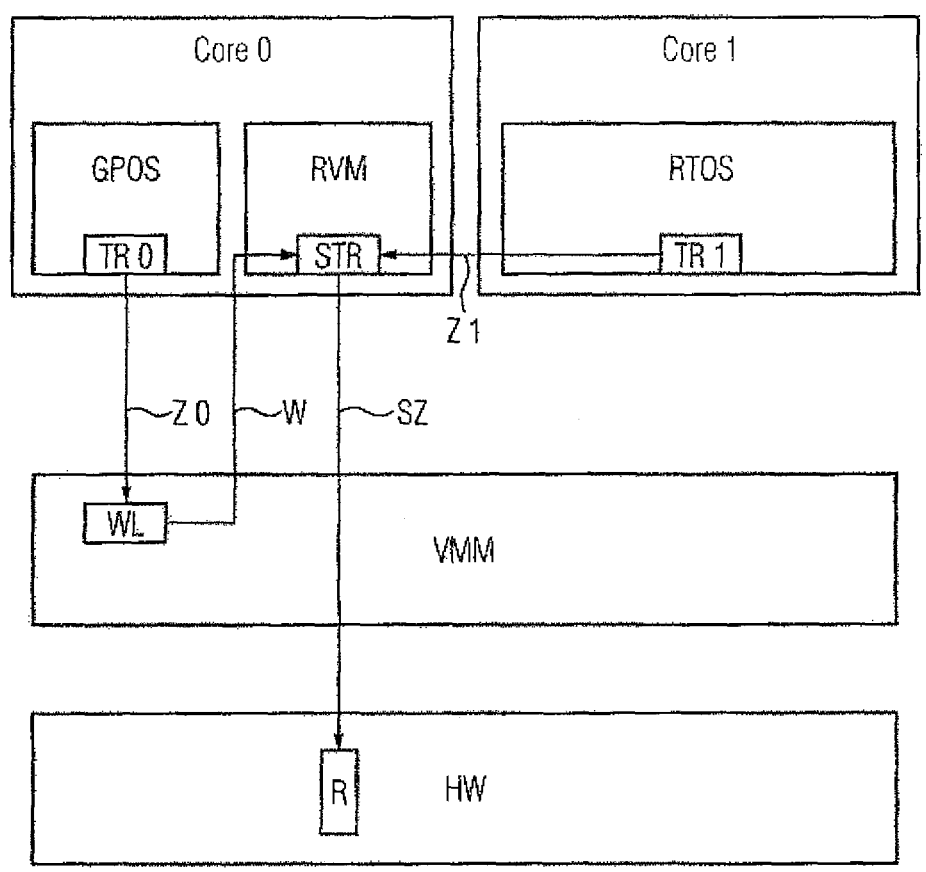
FIG. 3 is a schematic block diagram illustrating an embodiment of a hardware platform including three virtual machines in according with the invention.

FIG. 3 is a schematic block diagram illustrating an arrangement that is similar to FIG. 2, but in contrast to the arrangement depicted in FIG. 2, the synchronization of the access operations Z0, Z2 does not occur in the virtualization controller VMM. Instead, the access operations Z0 of the general operating system GPOS are passed on by a passing-on device WL of the virtualization controller VMM to the driver STR of the service machine RVM, where the passed-on access operations W are synchronized with the access operations Z1 of the real-time operating system RTOS within the service machine RVM. As a result, the synchronized access operations SZ do not have to be intercepted by the virtualization controller VMM but instead can also be transmitted directly from the service machine RVM to the resource R when the virtualization controller VMM is not active. In a further embodiment, the passing-on device WL can also be dispensed with if the driver TR0 transmits the access operations Z0 to the service manager RVM and the driver STR in some other way, such as directly. This corresponds to a para-virtualized approach for the general operating system GPOS.

It should be understood that numerous embodiments are possible as alternatives to the described methods and arrangements. For example, there may be one instance as well as a plurality of instances of a service machine RVM ("Resource Virtual Machine") for various resources R. A plurality of instances can operate "in parallel" and independently of one another here, and can even run distributed among various processor cores or processors. Likewise, the same instance of the real-time operating system RTOS can run on a plurality of processor cores. Operation of the system in this manner, however, requires an assignment as to which of the processor cores of the real-time operating system RTOS an access operation Z1 has been made to the service machine RVM.

Conversely, embodiments are contemplated in which a plurality of real-time operating systems RTOS can also be made to run on different processor cores. Here, however, this requires an assignment as to which of the real-time operating systems RTOS and which processor core Core 0, Core 1, . . . has made the order (access operation Z1) to the service machine RVM. Further embodiments of a plurality of processor cores, processors, real-time operating systems RTOS and other operating systems GPOS are conceivable, and it is not the intention to be limited to those presently described.

Figure 4:
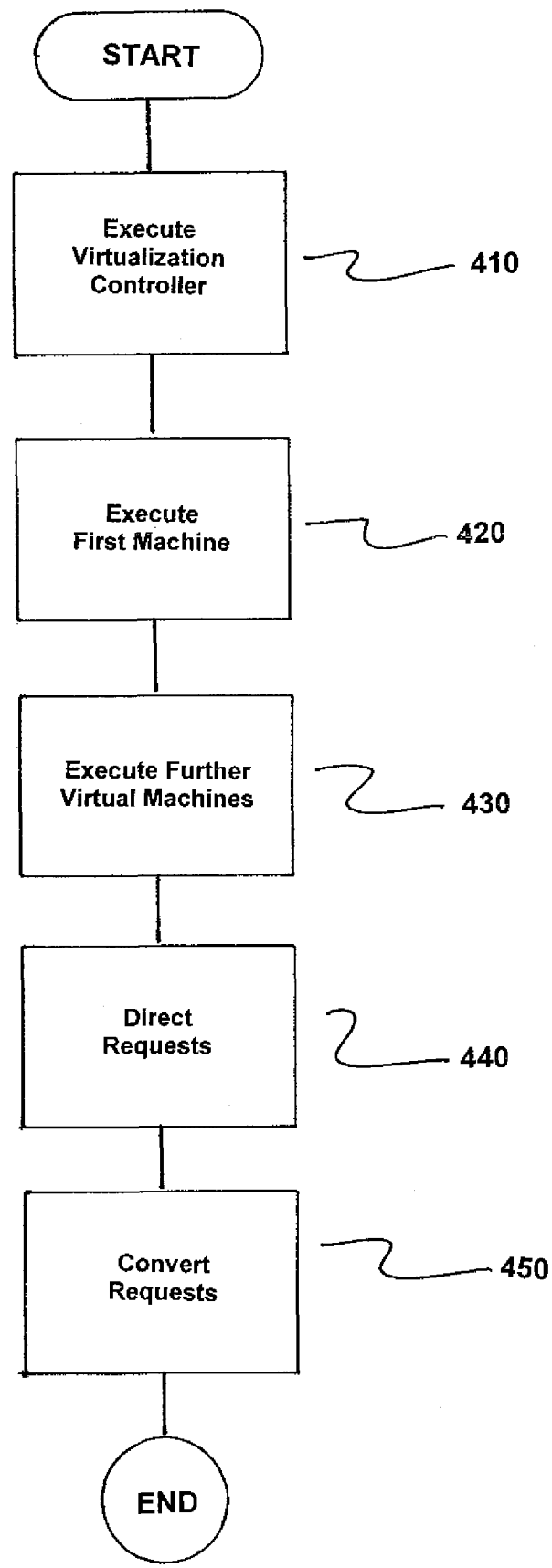
FIG. 4 is a flowchart of the method in accordance with an embodiment of the invention.

FIG. 4 is a flowchart of a method for using a resource of a hardware platform including a plurality of virtual machines. The method comprises executing, on the hardware platform, a virtualization controller for administering the plurality of virtual machines, as indicated in step 410.

Next, a first machine of the plurality of virtual machines is executed and a first operating system is included separately on at least a first processor core, as indicated in step 420. Here, the first operating system includes a para-virtualized first driver for accessing a resource.

A number of further virtual machines are executed on at least one further processor core, as indicated in step 430. Here, one of the number of further virtual machines comprises a service machine including a second driver for accessing the resource.

Requests by the para-virtualized first driver to access the resource are directed to the second driver, as indicated in step 440. The second driver then converts the requests into access operations to the resource, as indicated in step 450.

While there have been shown, described and pointed out fundamental novel features of the invention as applied to a preferred embodiment thereof, it will be understood that various omissions and substitutions and changes in the form and details of the methods and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for using a resource of a hardware platform including a plurality of virtual machines, comprising the steps of:
   executing, on the hardware platform, a virtualization controller for administering the plurality of virtual machines;
   executing a first machine of the plurality of virtual machines and including a first operating system separately on at least a first processor core, the first operating system including a para-virtualized first driver for accessing a resource;
   executing a number of further virtual machines on at least one further processor core, one of the number of further virtual machines comprising a service machine including a second driver for accessing the resource;
   directing requests by the para-virtualized first driver to access the resource to the second driver, said requests by the para-virtualized first driver occurring without interacting with the virtualization controller such that real-time processing is uninterrupted; and
   converting, by the second driver, the requests into access operations to the resource.

2. The method as claimed in claim 1, wherein the first operating system comprises a real-time operating system.

3. The method as claimed in claim 1, wherein at least one further operating system executes on one of the number of further virtual machines.

4. The method as claimed in claim 3, wherein the further operating system comprises a general operating system.

5. The method as claimed in claim 1, wherein the service machine is activated during the requests by the para-virtualized first driver.

6. The method as claimed in claim 1, the method further comprising the steps of:
   transmitting an inter-processor interrupt from the first virtual machine to the at least one further processor core with the service machine during the requests by the para-virtualized second driver; and
   entering the service machine into a processing routine of the second driver.

7. The method as claimed in claim 6, wherein the inter-processor interrupt comprises a start signal or an Init signal.

8. The method as claimed in claim 3, wherein the service machine coordinates, by a synchronization device, access operations by the first and the at least one further operating systems to the same resource.

9. The method as claimed in claim 3, wherein the virtualization controller coordinates, by a synchronization device, access operations by the first and the at least one further operating system to the same resource.

10. A hardware platform comprising:
   a plurality of processor cores;
   a plurality of virtual machines;
   a virtualization controller for administering the plurality of virtual machines;
   a first virtual machine including a first operating system, the first virtual machine executing separately at least on a first processor core of the plurality of processing cores;
   a number of further virtual machines executing on at least one further processor core;
   wherein the number of further virtual machines comprises a service machine including a first driver for accessing the resource;
   wherein the first operating system includes a para-virtualized second driver for accessing the resource; and
   wherein the para-virtualized second driver is configured such that requests from the para-virtualized second driver to access the resource are directed to the first driver which is configured to convert the requests into access operations to the resource, said requests by the para-virtualized second driver occurring without interacting with the virtualization controller such that real-time processing is uninterrupted.

* * * * *